(12) United States Patent
Carpenter

(10) Patent No.: US 10,987,984 B2
(45) Date of Patent: Apr. 27, 2021

(54) AUTOMATED TRAILER HITCHING USING IMAGE COORDINATES

(71) Applicant: Continental Automotive Systems, Inc., Auburn Hills, MI (US)

(72) Inventor: Kyle P Carpenter, Rochester, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/139,531

(22) Filed: Sep. 24, 2018

(65) Prior Publication Data

US 2019/0092109 A1 Mar. 28, 2019

Related U.S. Application Data

(60) Provisional application No. 62/562,751, filed on Sep. 25, 2017.

(51) Int. Cl.
*B60D 1/36* (2006.01)
*B60D 1/62* (2006.01)
(Continued)

(52) U.S. Cl.
CPC .......... *B60D 1/36* (2013.01); *B60D 1/62* (2013.01); *B62D 6/001* (2013.01); *B62D 15/0285* (2013.01); *G05D 1/0088* (2013.01); *G05D 1/0221* (2013.01); *G05D 1/0223* (2013.01); *G06K 9/00791* (2013.01); *G06N 3/08* (2013.01); *G06N 20/00* (2019.01); *G06T 7/74* (2017.01); *G05D 2201/0213* (2013.01); *G06T 2207/30252* (2013.01)

(58) Field of Classification Search
CPC combination set(s) only.
See application file for complete search history.

(56) References Cited

U.S. PATENT DOCUMENTS

| 2009/0236825 | A1 | 9/2009 | Okuda et al. | |
| 2016/0304122 | A1* | 10/2016 | Herzog | B60D 1/36 |
| 2017/0151846 | A1* | 6/2017 | Wuergler | B60D 1/62 |

FOREIGN PATENT DOCUMENTS

| DE | 102012001380 A1 | 8/2012 |
| EP | 3081405 A2 | 10/2016 |
| WO | 2018160960 A1 | 9/2018 |

OTHER PUBLICATIONS

International Search Report and the Written Opinion of the International Searching Authority dated Jan. 18, 2019 for corresponding PCT application No. PCT/US2018/052661.

* cited by examiner

*Primary Examiner* — Abby Y Lin
*Assistant Examiner* — Renee LaRose

(57) ABSTRACT

A method of maneuvering a vehicle in reverse for attachment to a trailer, includes receiving a trailer hitch receiver image location shown within one or more images from at least one vehicle camera. The method also includes determining, a pixel angular difference in the image between a tow vehicle fore-aft axis and a trailer fore-aft axis, determining a pixel distance between a tow vehicle hitch ball and a hitch receiver, and determining a vehicle path from an initial position to a final position adjacent the trailer. The vehicle path includes maneuvers configured to move the vehicle along the vehicle path from the initial position to the final position. Then autonomously following, at a drive system in communication with the computing device, the vehicle path from the initial position to the final position.

16 Claims, 11 Drawing Sheets

(51) Int. Cl.
*G06T 7/73* (2017.01)
*B62D 15/02* (2006.01)
*G06N 20/00* (2019.01)
*B62D 6/00* (2006.01)
*G05D 1/00* (2006.01)
*G05D 1/02* (2020.01)
*G06K 9/00* (2006.01)
*G06N 3/08* (2006.01)

AUTOMATED TRAILER HITCHING USING IMAGE COORDINATES

TECHNICAL FIELD

This disclosure relates to an automotive vehicle, and more particularly to a driver assistance system for automotive vehicles to aid in hitching the vehicle to a trailer.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some example, the trailer is electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

Some of the challenges that face tow vehicle drivers are connecting the tow vehicle to the trailer, because more than one person is needed. For example, one person drives the vehicle, e.g., the driver, and another one or more people are needed to view the tow vehicle and the trailer and provide the driver with direction regarding the path the tow vehicle has to take to align with the hitch. If the people providing directions to the driver are not accustomed to hitching a tow vehicle to a trailer, then they may have difficulty providing efficient instructions for directing the path of the tow vehicle.

Recent advancements in sensor technology have led to improved safety systems for vehicles. Arrangements and methods for detecting and avoiding collisions are becoming available. Such driver assistance systems use sensors located on the vehicle to detect an ongoing collision. In some examples, the system may warn the driver of one or more driving situations to prevent or minimize collisions. Additionally, sensors and cameras may also be used to alert a driver of possible obstacles when the vehicle is traveling in a forward direction. Therefore, it is 38]-desirable to provide a system that includes sensors to overcome the challenges faced by drivers of tow vehicles.

SUMMARY

One general aspect includes a method of maneuvering a vehicle in reverse for attachment to a trailer, including: detecting, by a neural network of the vehicle, one or more trailers within one or more images, detecting a trailer hitch receiver in the image. The method of maneuvering also includes determining, at a computing device in communication with the neural network, a pixel angular difference in the image between a tow vehicle fore-aft axis and a trailer fore-aft axis, determining a pixel distance between a tow vehicle hitch ball and a hitch receiver, determining a vehicle path from an initial position to a final position adjacent the trailer. The vehicle path including maneuvers configured to move the vehicle along the vehicle path from the initial position to the final position. Also including determining vehicle path including maneuvers configured to move the vehicle along the vehicle path from the initial position to the final position and then autonomously following, at a drive system in communication with the computing device, the vehicle path from the initial position to the final position.

One general aspect includes a method of maneuvering a vehicle in reverse for attachment to a trailer, including: receiving a trailer hitch receiver image location selected by a driver using a user interface, where the trailer hitch receiver is shown within one or more images from at least one vehicle camera. The method of maneuvering also includes determining, at a computing device, a pixel angular difference in the image between a tow vehicle fore-aft axis and a trailer fore-aft axis, determining a pixel distance between a tow vehicle hitch ball and a hitch receiver, determining a vehicle path from an initial position to a final position adjacent the trailer. The vehicle path including maneuvers configured to move the vehicle along the vehicle path from the initial position to the final position. Also including determining vehicle path including maneuvers configured to move the vehicle along the vehicle path from the initial position to the final position and then autonomously following, at a drive system in communication with the computing device, the vehicle path from the initial position to the final position.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

DESCRIPTION OF DRAWINGS

The present disclosure will become more fully understood from the detailed description and the accompanying drawings, wherein.

Like reference symbols in the various drawings indicate like elements.

DETAILED DESCRIPTION

Figure 1A:
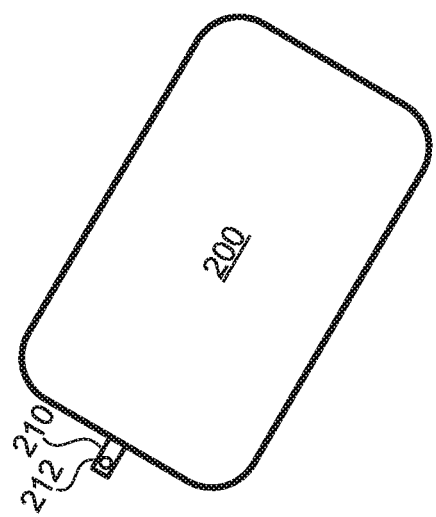
FIG. 1A is a schematic view of an exemplary tow vehicle and a trailer behind the tow vehicle.
Figure 1A:
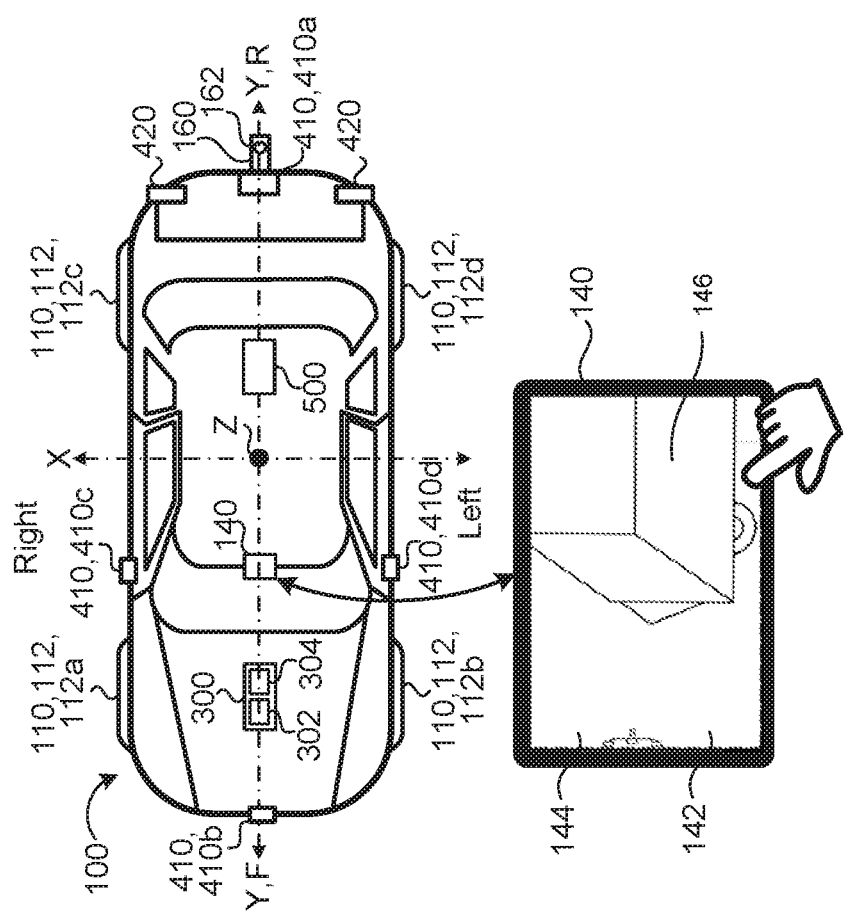

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that is capable to having a more automated system and method for maneuvering towards a trailer and attaching to the trailer, thus reducing the need for a driver to drive the tow vehicle in a rearward direction while another one or more people provide the driver with directions regarding the path that the tow vehicle has to take to align with the trailer and ultimately a hitch of the trailer. As such, a tow vehicle with an assistance device for rearward driving provides a driver with a safer and faster experience when hitching the tow vehicle to the trailer.

Referring to FIGS. 1A-2C, in some implementations, a driver of a tow vehicle 100 wants to tow a trailer 200. The tow vehicle 100 may be configured with a driver assistance system 310 to provide guidance to the driver to drive towards the selected trailer 200. The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 120 that includes brakes associated with each wheel 112, 112a-d, and an acceleration system 130 that is configured to adjust a speed and direction of the tow vehicle 100. In addition, the drive system 110 may include a suspension system 132 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 132 improves the road handling of the tow vehicle 100 and provides a better ride quality by isolating road noise, bumps, and vibrations. In addition, the suspension system 132 is configured to adjust a height of the tow vehicle 100 allowing the tow vehicle hitch 160 to align with the trailer hitch 210, which aids in connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis x, extends between a right side R and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 132 adjusts the suspension of the tow vehicle 100, the tow vehicle 100 may tilt about the X axis and or Y axis, or move along the central vertical axis Z.

A driver assistance system 310 may include a user interface 140. The user interface 140 may be a display that is incorporated into the vehicle or may be provided on a separate device, such as a personal wireless device. The user interface 140 receives one or more user commands from the driver via one or more input mechanisms or a touch screen display 142 and/or displays one or more notifications to the driver. The user interface 140 is in communication with a vehicle controller 300, which is in turn in communication and sensor system 400 and a drive system 110. In some examples, the user interface 140 displays an image of an environment of the tow vehicle 100 leading to one or more commands being received by the user interface 140 (from the driver) that initiate execution of one or more behaviors. The vehicle controller 300 includes a computing device (or processor) 302 (e.g., central processing unit having one or more computing processors) in communication with non-transitory memory 304 (e.g., a hard disk, flash memory, random-access memory) capable of storing instructions executable on the computing processor(s)).

The vehicle controller 300 executes a driver assistance system 310, which in turn includes a path following sub-system 320. The path following sub-system 320 receives a planned path 552 (FIGS. 4A and 4B) from a path planning system 550 and executes behaviors 322-330 that send commands 301 to the drive system 110, leading to the tow vehicle 100 autonomously driving about the planned path 552 in a rearward direction R.

Figure 4A:
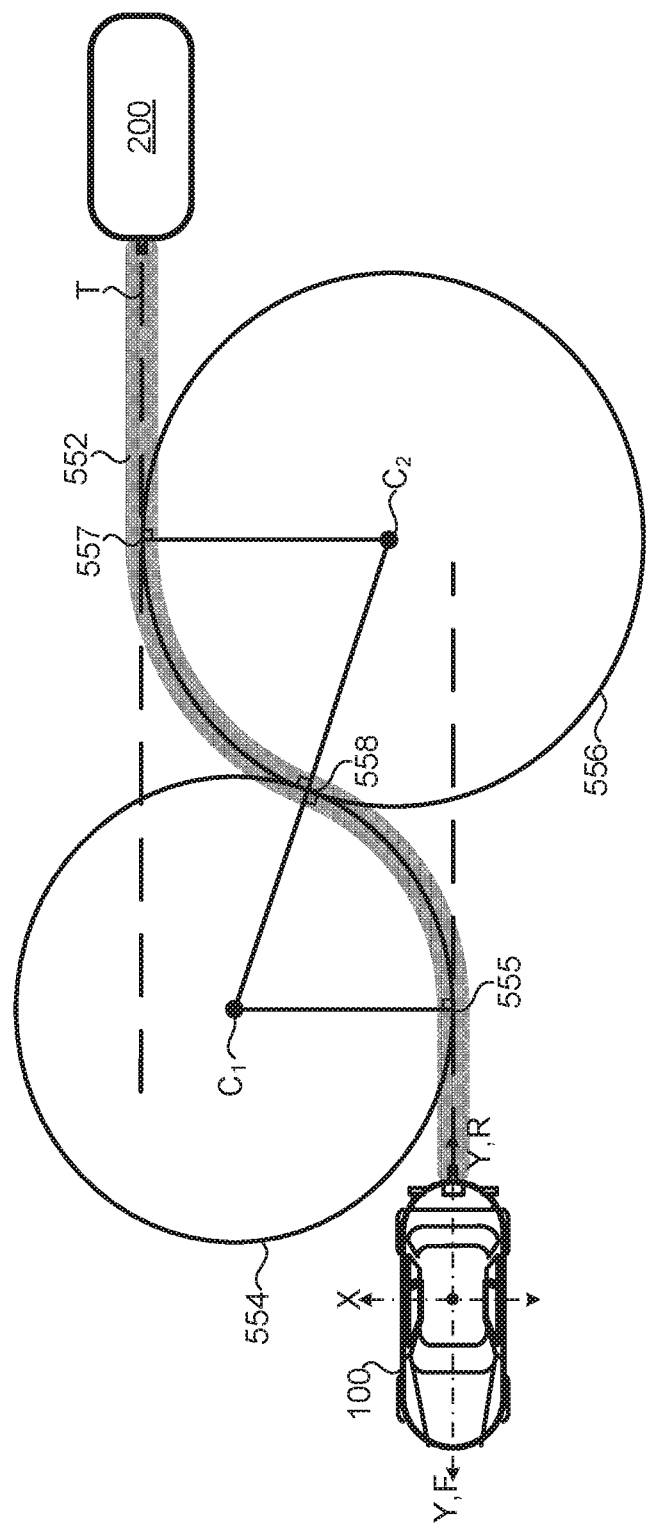
FIGS. 4A and 4B are perspective views of an exemplary tow vehicle autonomously maneuvering along a planned path.
Figure 5A:
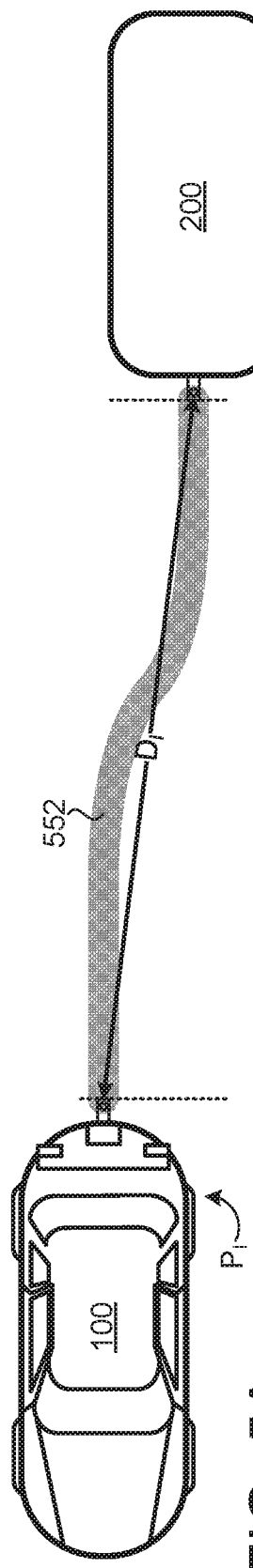
FIG. 5A is a perspective view of an exemplary tow vehicle at an initial position.
Figure 5B:
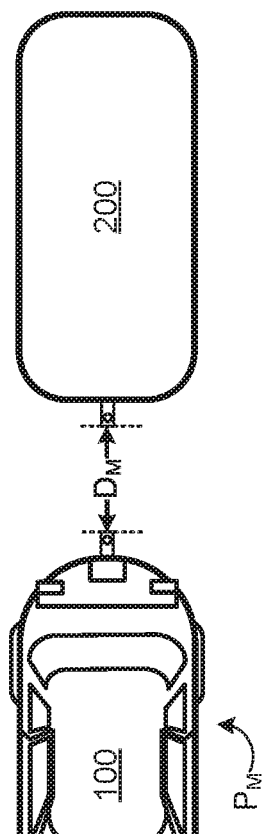
FIG. 5B is a perspective view of an exemplary tow vehicle at an intermediate position.
Figure 5C:
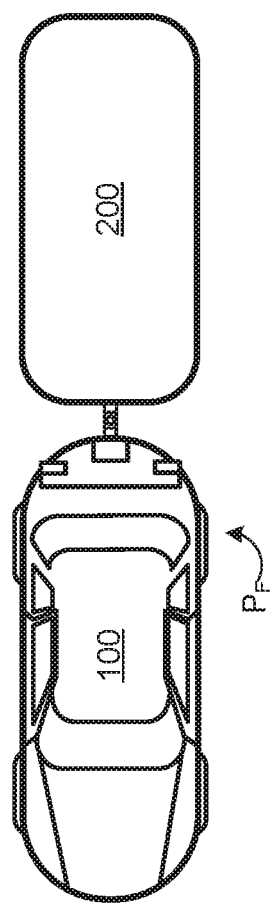
FIG. 5C is a perspective view of an exemplary tow vehicle at a final position.
Figure 6A:
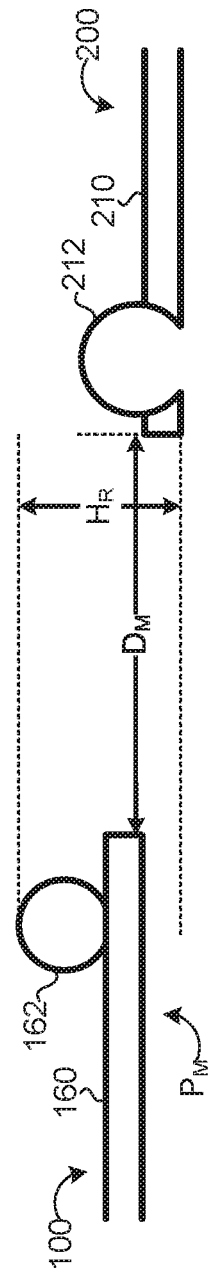
FIGS. 6A-6D are perspective views of an exemplary vehicle hitch connecting to a trailer hitch.
Figure 6B:
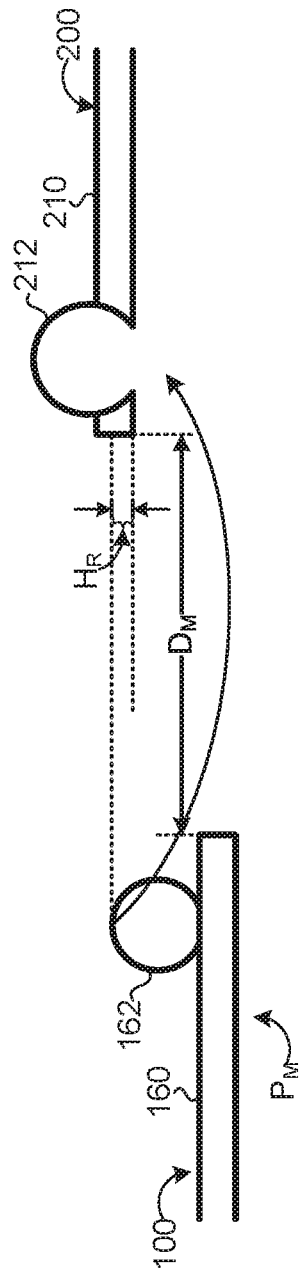
Figure 6C:
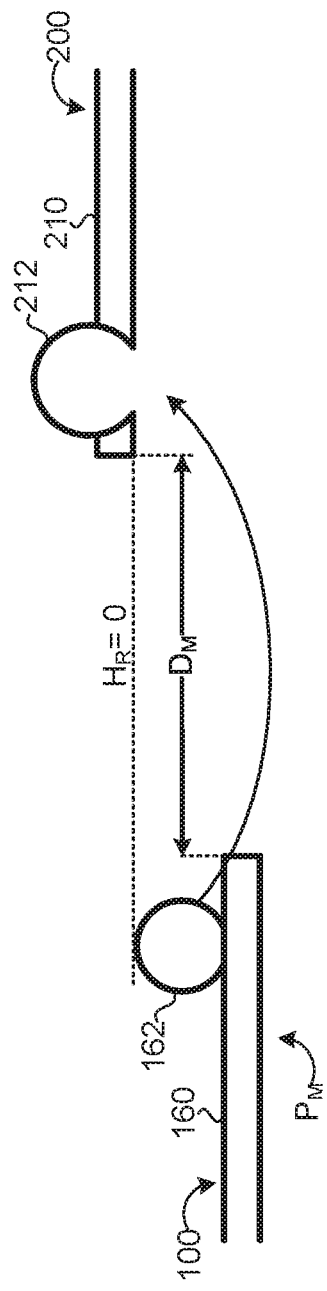
Figure 6D:
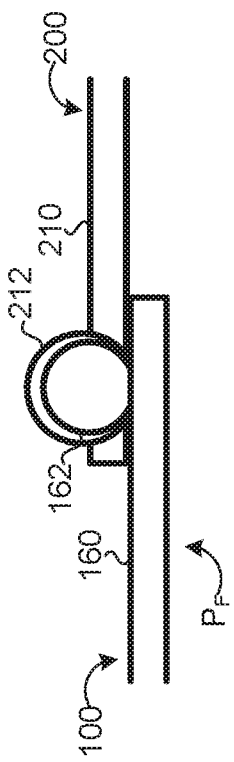

The path following sub-system 320 includes, a braking behavior 322, a speed behavior 324, a steering behavior 326, a hitch connect behavior 328, and a suspension adjustment behavior 330. Each behavior 322-330 cause the tow vehicle 100 to take an action, such as driving backward, turning at a specific angle, breaking, speeding, slowing down, among others. The vehicle controller 300 may maneuver the tow vehicle 100 in any direction across the road surface by controlling the drive system 110, more specifically by issuing commands 301 to the drive system 110. For example, the vehicle controller 300 may maneuver the tow vehicle 100 from an initial position (as shown in FIG. 4A) to a final position (as shown in FIG. 5C). In the final position, a hitch ball 162 of the tow vehicle 100 aligns with a hitch coupler 212 of the trailer 200 connecting the tow vehicle 100 and the selected trailer 200.

The tow vehicle 100 may include a sensor system 400 to provide reliable and robust autonomous driving. The sensor system 400 may include different types of sensors that may be used separately or with one another to create a perception of the tow vehicle's environment that is used for the tow vehicle 100 to autonomously drive and make intelligent decisions based on objects and obstacles detected by the sensor system 400. The sensors may include, but not limited to, one or more imaging devices (such as cameras) 410, and sensors 420 such as, but not limited to, radar, sonar, LIDAR (Light Detection and Ranging, which can entail optical remote sensing that measures properties of scattered light to find range and/or other information of a distant target), LADAR (Laser Detection and Ranging), etc. In addition, the camera(s) 410 and the sensor(s) 420 may be used to alert the driver of possible obstacles when the tow vehicle 100 is traveling in the forward direction F or in the rearward direction R, by way of audible alerts and/or visual alerts via the user interface 140. Therefore, the sensor system 400 is especially useful for increasing safety in tow vehicles 100 which operate under semi-autonomous or autonomous conditions.

In some implementations, the tow vehicle 100 includes a rear camera 410, 410a that is mounted to provide a view of a rear driving path for the tow vehicle 100. Additionally, in some examples, the tow vehicle 100 includes a front camera 410, 410b to provide a view of a front driving path for the tow vehicle 100, a right camera 410, 410c positioned on the right side of the tow vehicle 100, and a left camera 410, 410d positioned on the left side of the tow vehicle 100. The left and right cameras 410, 410c, 410d provide additional side views of the tow vehicle 100. In this case, the tow vehicle 100 may detect object and obstacles positioned on either side of the tow vehicle 100, in addition to the objects and obstacle detected along the front and rear driving paths. The camera(s) 410, 410a-d may be a monocular camera, binocular camera, or another type of sensing device capable of providing a view of the rear travelling path of the tow vehicle 100.

In some implementations, the tow vehicle 100 includes one or more Neural Networks (NN) 500, for example, Deep Neural Networks (DNN) to improve the autonomous driving of the tow vehicle 100. DNNs 500 are computational approaches used in computer science, among other disciplines, and are based on a large collection of neural unites, loosely imitating the way a biological brain solves problems with large clusters of biological neurons connected by axons. DNNs 500 are self-learning and trained, rather than programed, and excel in areas where the solution feature detection is difficult to express in a traditional computer program. In other words, DNNs 500 are a set of algorithms that are designed to recognize patterns. DNNs 500 interpret sensor system data 402 (e.g., from the sensor system 400) through a machine perception, labeling or clustering raw input. The recognized patters are numerical, vectors, into which all-real-world data, such as images, text, sound, or time series is translates. The DNN 500 includes multiple layers of nonlinear processing units 502 in communication with DNN non-transitory memory 504. The DNN non-transitory memory 504 stores instructions that when executed on the nonlinear processing units 502 cause the DNN 500 to provide an output 506, 508. Each nonlinear processing unit 502 is configured to transform an input or signal (e.g., sensor system data 402) using parameters that are learned through training. A series of transformations from input (e.g., sensor system data 402) to outputs 506, 508 occurs at the multiple layers of the nonlinear processing units 502. Therefore, the DNN 500 is capable of determining the location based on images 412 or sensor data 422 eliminating the need to have a DGPS or a GPS.

The DNN 500 receives sensor system data 402 (including images 412 and/or sensor data 422) and based on the received data 420 provides an image output 506 to the user interface 140 and/or a data output 508 to the vehicle controller 300. In some examples, the DNN 500 receives image(s) 412 of a rear view of the tow vehicle 100 from the camera 410 in communication with the DNN 500. The DNN 500 analyzes the image 412 and identifies a trailer 200 and a trailer hitch receiver 212 in the received image 412. The DNN 500 may also receive sensor data 420 from the sensors 420 in communication with the DNN 500, and analyze the received sensor data 420. Based on the analyzed images 412 (or the analyzed images 412 and the sensor data 422), the DNN 500 identifies the location of the trailer hitch receiver 212 relative to the tow vehicle hitch ball 162, as described in further detail below. As such, the DNN 500 displays on the user interface 140 the received images 412 displaying representations 146 of the trailer 200 located at a distance behind the tow vehicle 100. In some examples, the user interface is a touch screen display 142. In other examples, the user interface 140 is not a touchscreen and the driver may use an input device, such as, but not limited to, a rotary knob or a mouse.

Figure 1B:
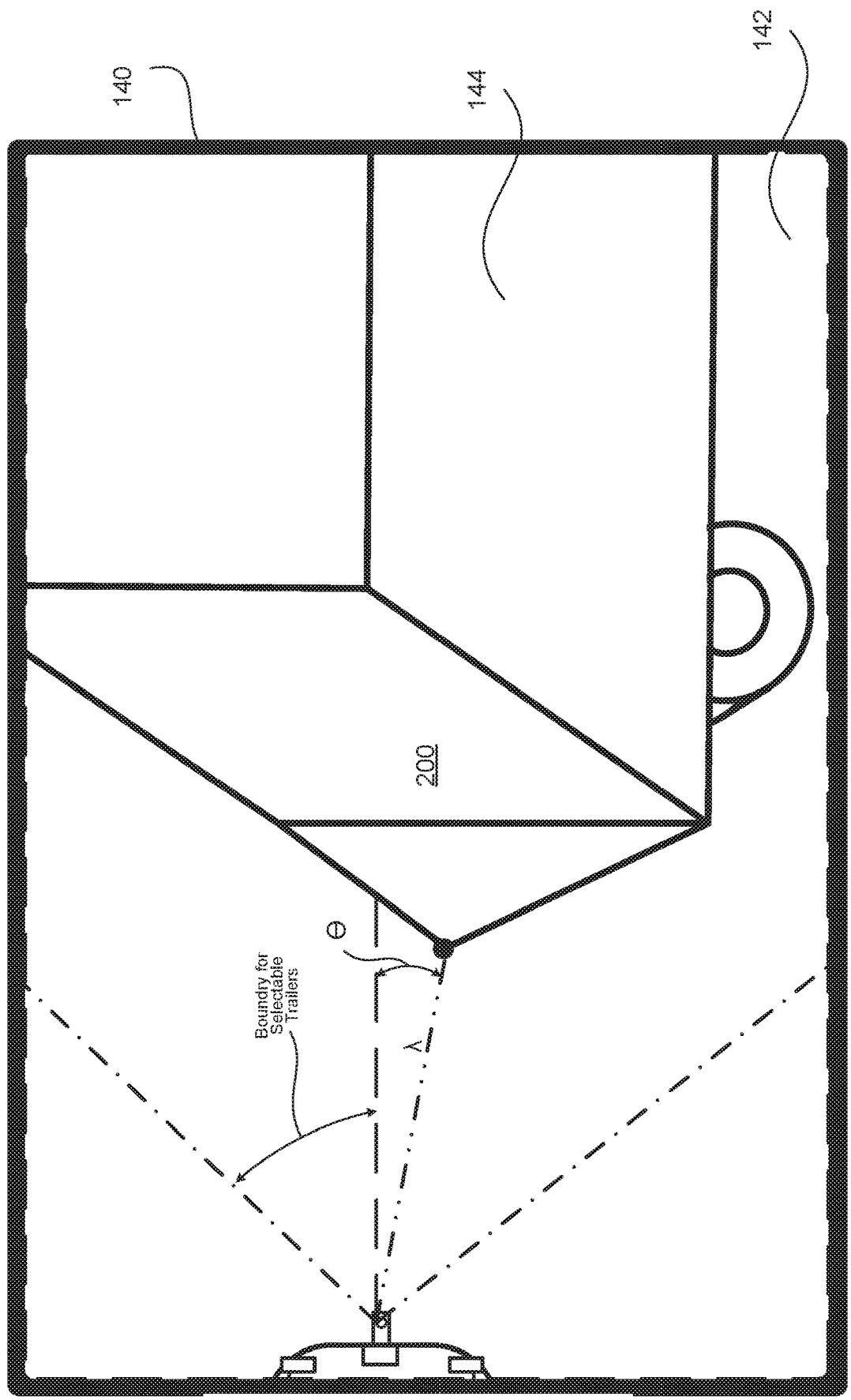
FIG. 1B is a schematic view of an exemplary user interface for detecting a trailer hitch receiver location.
Figure 3:
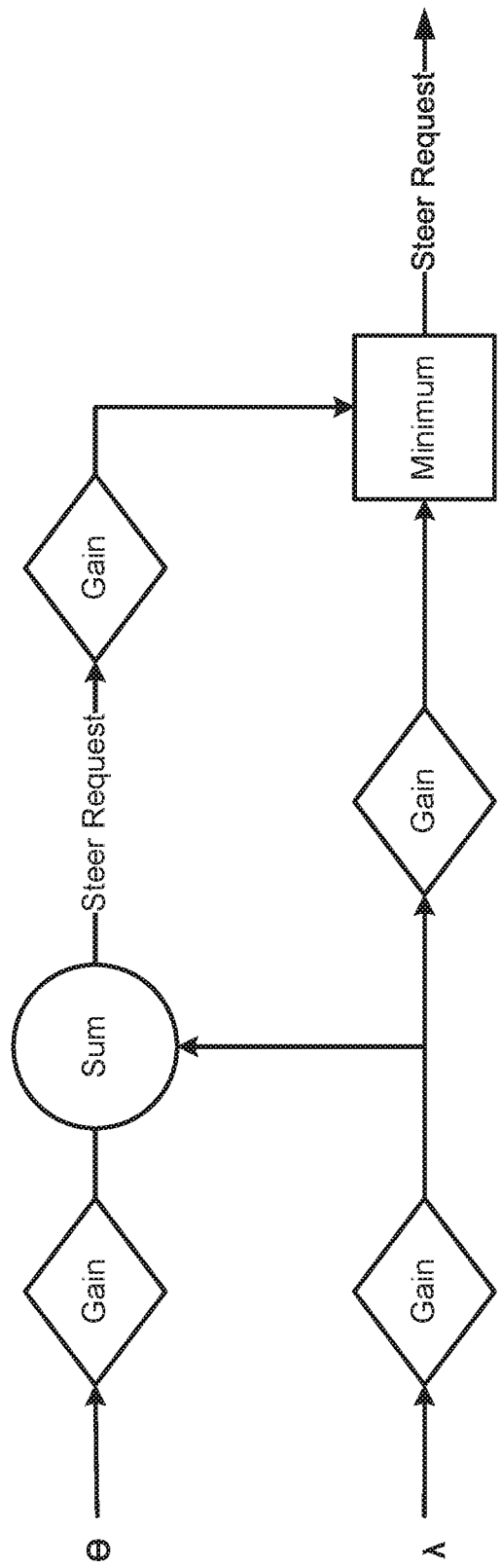
FIG. 3 is a control strategy for detecting a trailer hitch receiver location based upon image analysis.

Referring at least to FIGS. 1A, 1B and 3 the location of the trailer hitch receiver 212 is determined by the a Hitch Location System 520. The Hitch Location System 520 uses the DNN 500 or controller 300 to calculate image coordinate of the location of the trailer hitch receiver 212 ($X_T$, $Y_T$) and for the vehicle hitch ball location ($X_V$, $Y_V$) in the image 144. A boundary for detecting selectable trailers is schematically shown. The boundary may be limited by the field of view of the camera(s) 410, 410a or by limited by an angular difference between the vehicle 100 and the trailer 200 for which the DNN 500 can perform the image analysis and calculations, or may be limited by the by an angular difference between the vehicle 100 and the trailer 200 for which the path following sub-system 320 can perform. The boundary and the Hitch Location System 520 calculations are schematically illustrated on image 144 but may be entirely partially or may not actually be displayed in the image 144.

The DNN 500 or controller 300 can be taught to recognize the hitch receiver 212 in the image 144 as well as other trailer information, such as at least one horizontal trailer edge 220. Based on the detected trailer information the DNN 500 can calculate angular difference θ between the tow vehicle fore-aft axis Y and a trailer fore-aft axis T. The angular difference θ is the pixel angle between the identified tow vehicle fore-aft axis Y and a trailer fore-aft axis T in the image 144 by:

$$\theta = \tan^{-1}\left(\frac{\Delta x}{\Delta y}\right)$$

Where $\Delta x = X_T - X_V$ and $\Delta y = Y_T - Y_V$.

Further, a pixel distance (λ) between the image coordinate of the location of the trailer hitch receiver 212 ($X_T$, $Y_T$) and for the vehicle hitch ball location ($X_V$, $Y_V$) in the image 144 is also calculated by:

$$\Lambda = \sqrt{(\Delta x)^2 + (\Delta y)^2}$$

After the trailer 200 location, specifically the trailer hitch receiver 212 location is identified, a path planning system 550 plans a path 552 (FIG. 4A, 4B) between the tow vehicle 100 and the trailer 200 based on the location of the selected trailer 200 (determined by the DNN 500 or controller 300 from the received sensor system data 402) relative to a position of the tow vehicle 100 (e.g., orientation and distance). As the tow vehicle 100 is autonomously backing up towards the selected trailer 200. The planned path 552 allows the tow vehicle 100 to autonomously drive and connect to the trailer 200. The path planning system 550 plans the path 552 for the tow vehicle 100 to autonomously maneuver such that the tow vehicle 100, in an intermediate position within a predetermined distance D from the trailer 200, is in an orientation aligned generally parallel with the trailer 200 and facing away from the trailer 200, where the hitch 160 of the tow vehicle 100 is substantially aligned with the hitch 210 of the trailer 200.

In one embodiment, the angular difference θ between the tow vehicle fore-aft axis Y and the trailer fore-aft axis T and the pixel distance (λ) between the hitch ball 162 and the hitch receiver 212 are input into the control strategy shown to provide a steer request. Further details on the calculation of the steer request by the path planning system 550, 550B are described below.

Figure 2A:
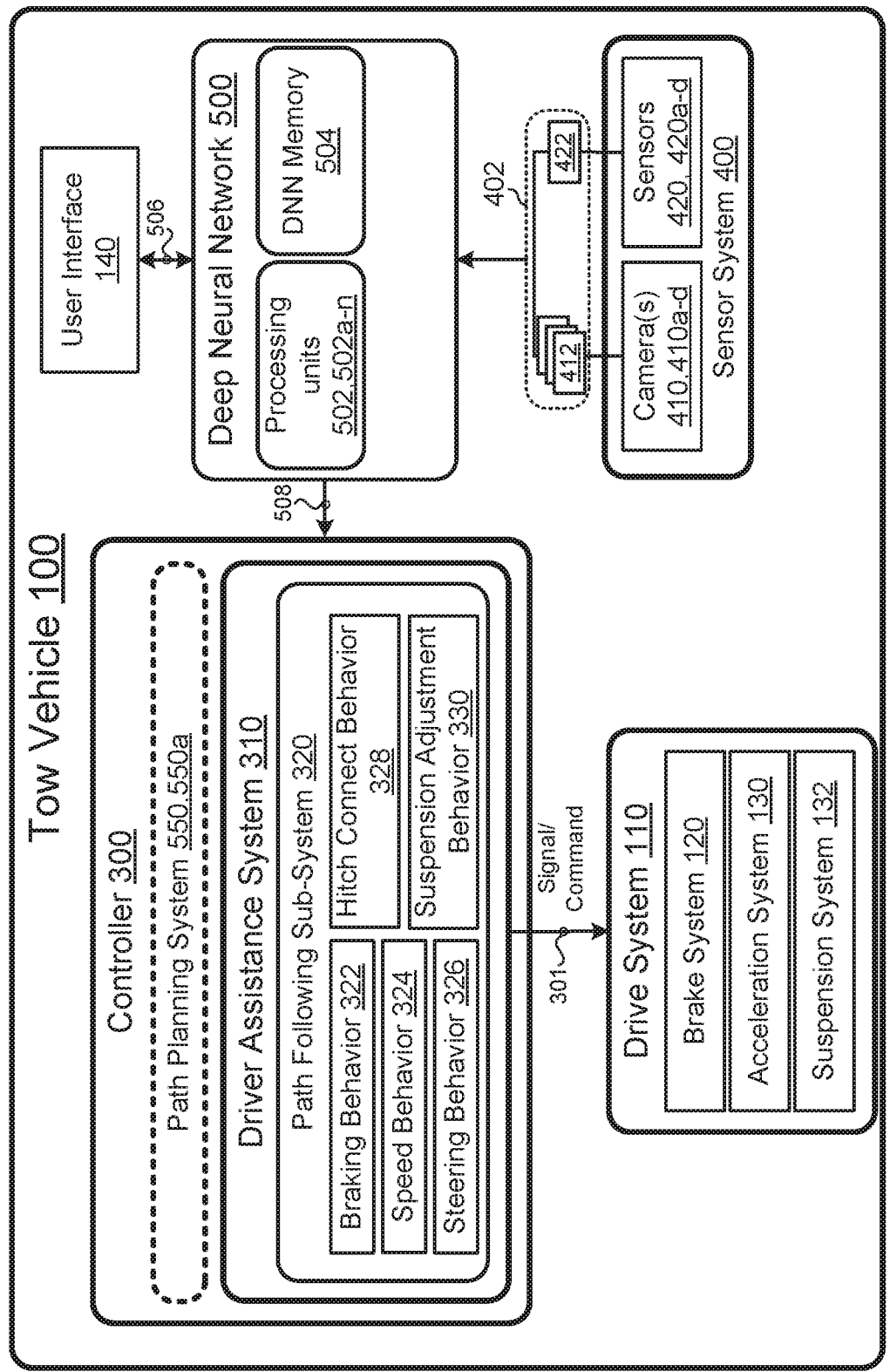
FIGS. 2A-2C are perspective views of an exemplary tow vehicle.
Figure 2B:
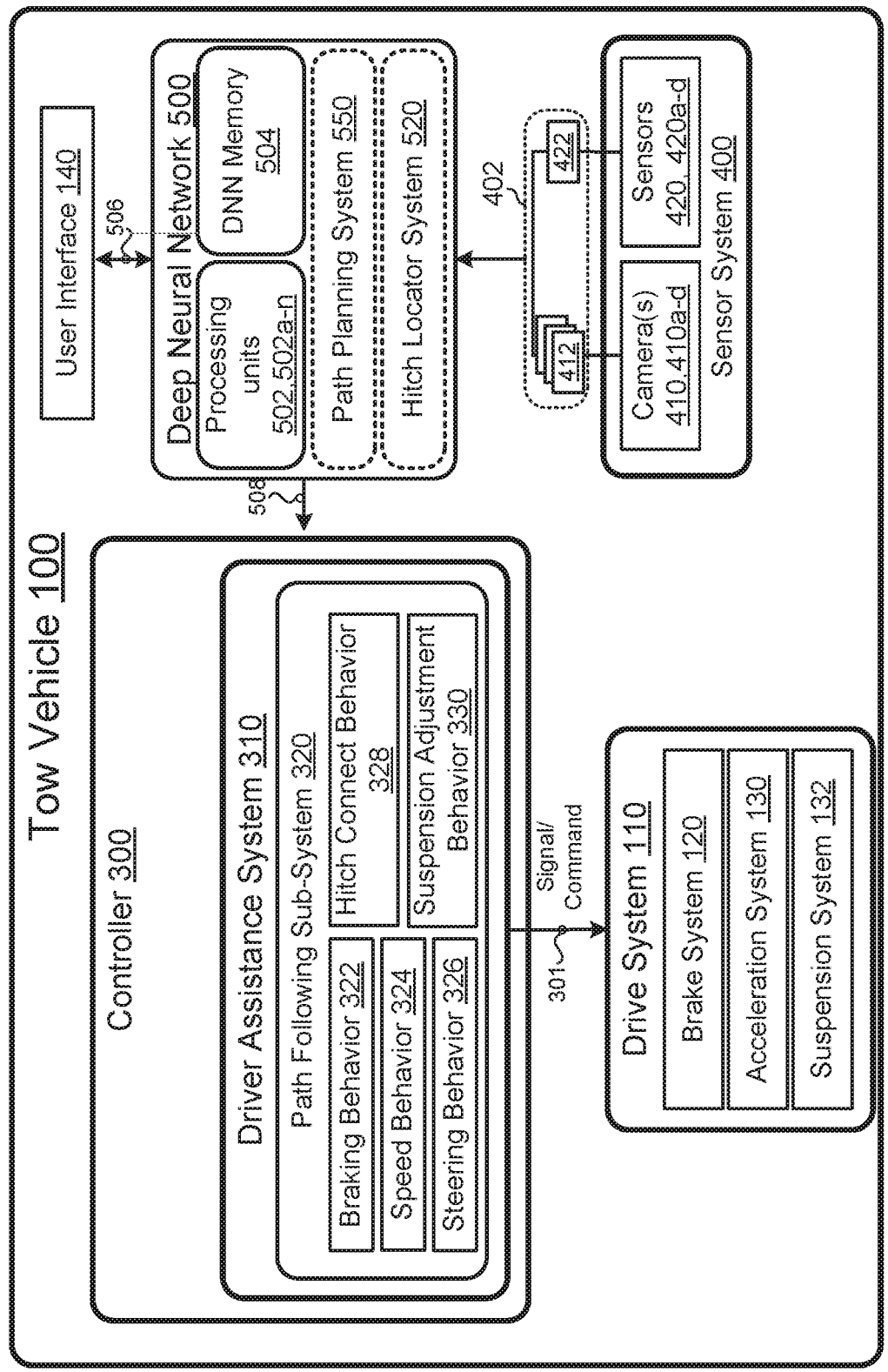

In some examples, the path planning system 550 is part of the vehicle controller 300 as shown in FIG. 2A; while in other examples, the path planning system 550 is part of the DNN 500 as shown in FIG. 2B. Referring to FIG. 2A, the DNN 500*a* sends the controller 300 data output 508 including the location of the selected trailer 200 with respect to the tow vehicle 100, as received from the user input device 140.

Figure 2C:
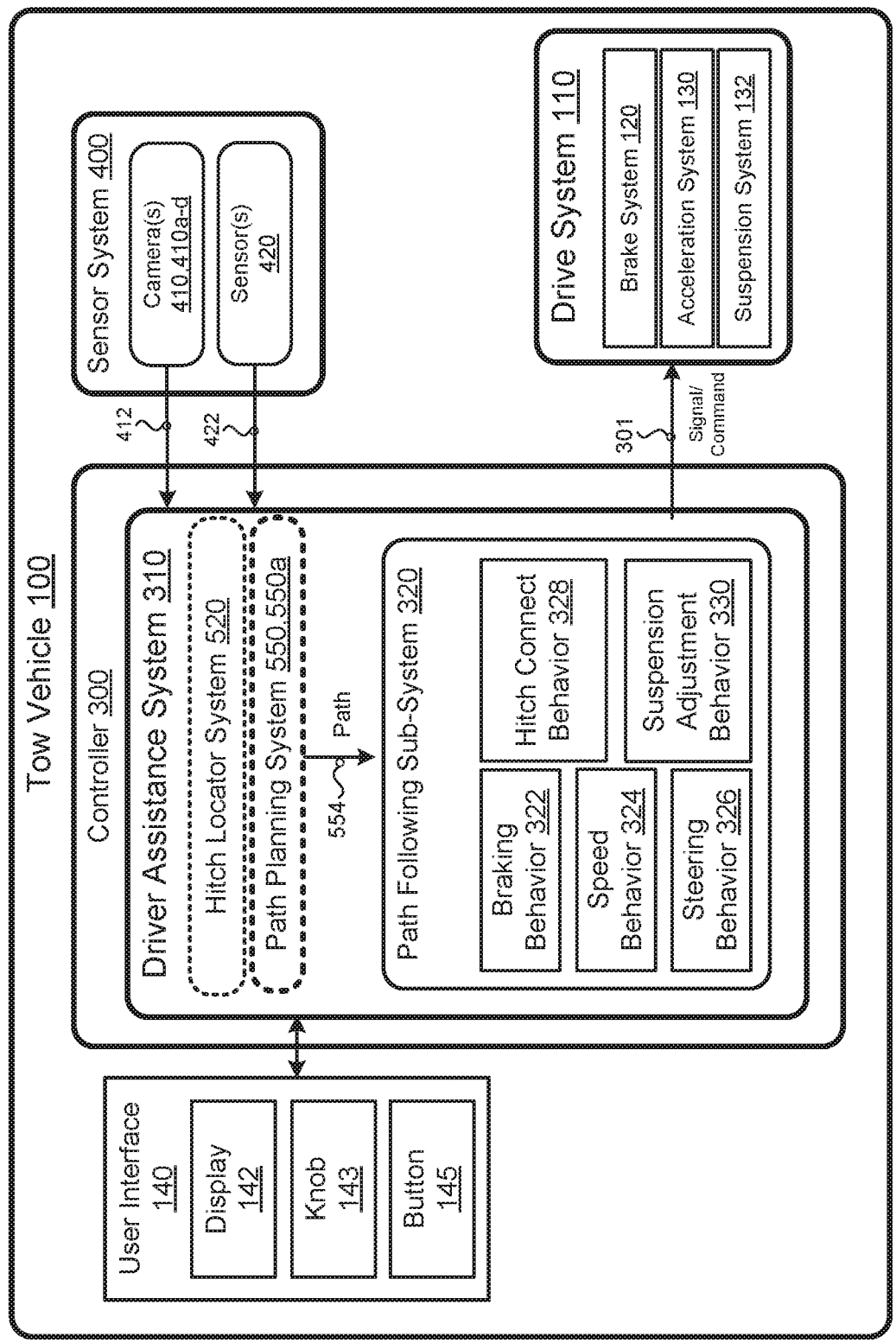

Further, FIG. 2C illustrates an exemplary embodiment of the tow vehicle 100 wherein the path planning system 550 is part of a controller and a DNN 500 is not utilized. In this embodiment, and also possibly the embodiment shown in FIG. 2B the driver of the tow vehicle 100 would be responsible for selecting the trailer receiver location 212 in the image. This may be done by manipulating a cursor with a knob 143 and button 145 for the user interface 140, by way of selecting the desired location on the image with the knob 143 and button 145, by selecting through a touch-screen display 142, or manipulating some other image (vehicle hitch coupler 162 path, wheel 112*c*-112*d* path, etc.) which represents a point of interest in the image 144 that corresponds to the location of the trailer hitch receiver 212.

Figure 4B:
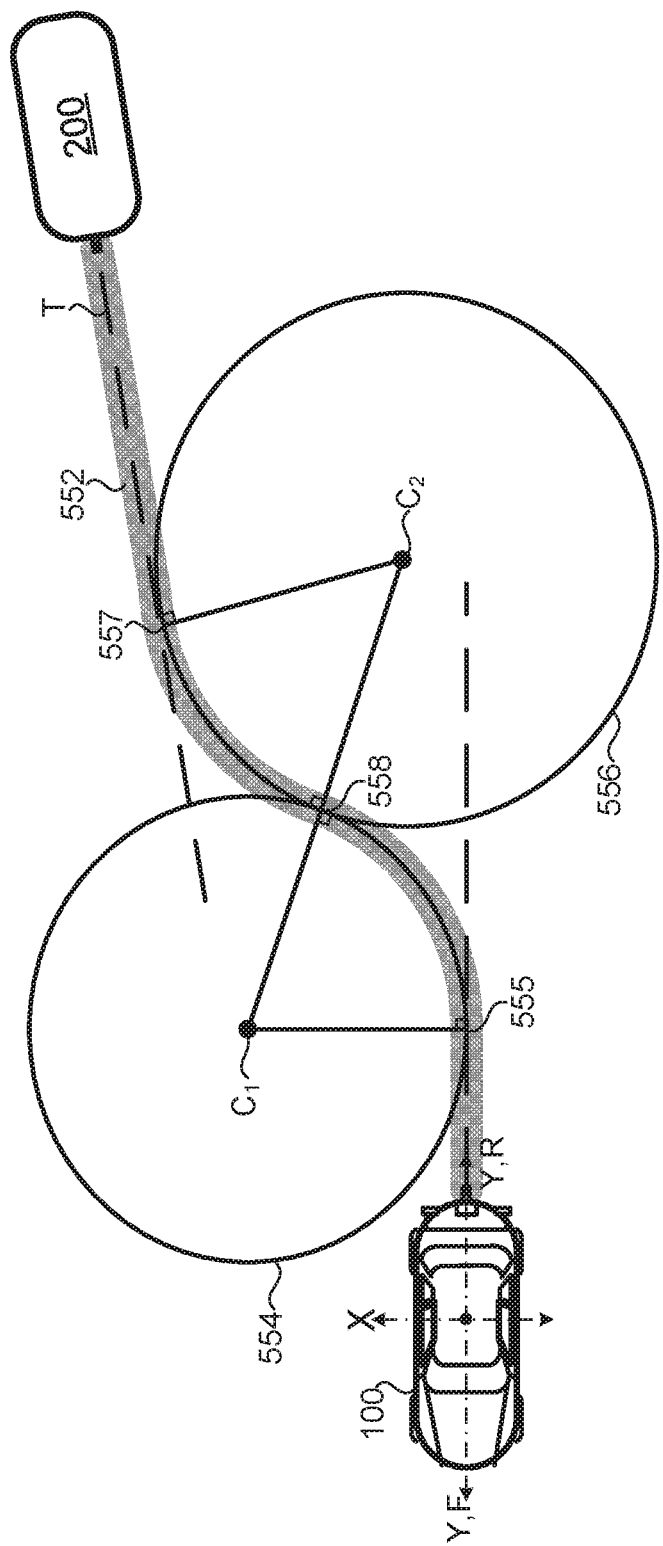

In one embodiment, the path planning system 550*a* plans the path 552 between the tow vehicle 100 and the selected trailer 200. The path planning system 550*a* may use several methods to determine the path 552. FIGS. 4A and 4B provide a method for path planning. In some examples, the path planning system 550*a* extends its fore-aft axis Y in the rearward direction R while the trailer 200 extends a fore-aft axis about the length of the trailer 200 in a forward direction. The path planning system 550*a* draws a first circle 554 tangent at a first tangent point 555 to the tow vehicle fore-aft axis Y facing the trailer fore-aft axis, and a second circle 556 tangent at a second tangent point 557 to the trailer fore-aft axis facing the tow vehicle fore-aft axis Y. The first and second circles 554, 556 intersect at an intersection point 558. The size of the first and second circles 554, 556 may be adjusted and manipulated based on the distance between the tow vehicle 100 and the trailer 200, obstacles and object positioned between the tow vehicle 100 and the trailer 200, and any other considerations. The path planning system 550*a* determines the path 552 by following the tow vehicle fore-aft axis Y until the first tangent point 555, then moving along an arc of the first circle 554 until the intersection point 558, then moving along an arc of the second circle 556 until the second tangent point 557, then following the trailer fore-aft axis. As such, the planned path 552 positions the tow vehicle 100 in an orientation aligned generally parallel with the trailer 200, where the hitch 160 of the tow vehicle 100 is substantially aligned with the hitch 210 of the trailer 200. In other words, where the fore-aft axis Y of the tow vehicle 100 is substantially aligned with the fore-aft axis T of the trailer 200. FIG. 4A shows an example of the path 552 where the fore-aft axis Y of the tow vehicle 100 is substantially parallel to the fore-aft axis T of the trailer 200. While FIG. 4B shows an example of the path 552 where the fore-aft axis Y of the tow vehicle 100 is not substantially parallel to the fore-aft axis T of the trailer 200.

With continued reference to FIGS. 2A, 4A and 4B, in some examples, when the tow vehicle 100 is autonomously driving along the planned path 552, the DNN 500 continuously sends the vehicle controller 300 the location of the selected trailer 200 with respect to the tow vehicle 100 as the tow vehicle 100 moves along the planned path 552 based on the received sensor system data 402, i.e., images 412.

In some examples, the DNN 500 identifies one or more objects along the planned path 552 and sends the path planning system 550*a* data relating to the position of the one or more objects. In this case, the path planning system 550*a* may recalculate the planned path 552 to avoid the one or more objects. In some examples, the path planning system 550*a* determined a probability of collision and if the probability of collision exceeds a predetermined threshold, the path planning system 550*a* adjusts the path and sends it to the path following sub-system 320.

Referring back to FIGS. 2A and 2B, once the path planning system 550 plans a path 552, the path following sub-system 320 is configured to execute behaviors the cause the drive system 110 to autonomously follow the planned path 552. Therefore, the path following sub-system 320 includes one or more behaviors 322-330 that once executed allow for the autonomous driving of the tow vehicle 100 along the planned path 552. The behaviors 322-330 may include, but are not limited to a braking behavior 322, a speed behavior 324, a steering behavior 326, a hitch connect behavior 328, and a suspension adjustment behavior 330.

The braking behavior 322 may be executed to either stop the tow vehicle 100 or to slow down the tow vehicle based on the planned path 552. The braking behavior 322 sends a signal or command 301 to the drive system 110, e.g., the brake system 120, to either stop the tow vehicle 100 or reduce the speed of the tow vehicle 100.

The speed behavior 324 may be executed to change the speed of the tow vehicle 100 by either accelerating or decelerating based on the planned path 552. The speed behavior 324 sends a signal or command 301 to the brake system 120 for decelerating or the acceleration system 130 for accelerating.

The steering behavior 326 may be executed to change the direction of the tow vehicle 100 based on the planned path. As such, the steering behavior 326 sends the acceleration system 130 a signal or command 301 indicative of an angle of steering causing the drive system 110 to change direction.

FIGS. 4A-5C show the tow vehicle 100 at an initial position $P_I$ (FIG. 4A), an intermediate position $P_M$ (FIG. 4B), and a final position $P_F$ (FIG. 5C) or a connected position, with respect to the selected trailer 200. Referring to FIG. 4A, the tow vehicle 100 is at the initial position $P_I$ relative to the trailer 200 prior to initiating autonomous maneuvering towards the selected trailer 200. In some examples, an initial distance $D_I$ between the tow vehicle 100 and the selected trailer 200 is about 15 meters. The tow vehicle 100 autonomously maneuvers along the planned path 552 until the tow vehicle 100 reaches an intermediate position $P_M$ being an intermediate distance $D_M$ from the selected trailer 200, as shown in FIG. 4B. In the intermediate position $P_M$, the tow vehicle hitch 160 is in an orientation aligned generally parallel with the selected trailer 200 and the tow vehicle hitch 160 is substantially aligned with the hitch 210 of trailer hitch 210. In other words, the vehicle fore-aft Y defines a plane that extends along the vehicle vertical axis Z and along the trailer fore-aft T along a trailer vertical axis. In some examples, the intermediate distance $D_M$ is about 1 meter.

Referring to FIGS. 6A-6D, in some examples, when the tow vehicle 100 is in the intermediate position $P_M$ the hitch connect behavior 328 executes to connect the vehicle hitch 160 with the trailer hitch 210. The DNN 500 determines a relative height $H_R$ between a top portion of the tow vehicle hitch ball 162 and a bottom portion of the trailer hitch coupler 212. To connect the tow vehicle 100 and the selected trailer 200, the trailer hitch coupler 212 releasably receives the tow vehicle hitch ball 162. Therefore, to connect the tow vehicle hitch ball 162 to the trailer hitch coupler 212, the relative height $H_R$ has to equal zero allowing the tow vehicle hitch ball 162 to move under and be inserted in the trailer hitch coupler 212. Therefore, when the hitch connect behavior 328 receives the relative height $H_R$ that is greater than zero between the tow vehicle hitch ball 162 and the trailer hitch coupler 212 from the DNN 500, the hitch connect behavior 328 sends a command to the suspension adjustment behavior 330 to execute and issue a command 301 to the suspension system 132 to adjust the height of the tow vehicle 100 reducing the relative height $H_R$ based on the measurements from the DNN 500. When the hitch connect behavior 328 receives the relative height $H_R$ that is equal to zero, then the hitch connect behavior 328 issues a command 301 to the drive system 110 to maneuver along the remainder of the path 552, i.e., from the intermediate position $P_M$ to the final position $P_F$ (FIG. 5C), connecting the tow vehicle 100 to the selected trailer 200.

Alternately, as shown in FIGS. 2B-2C this may be completed by the controller 300 rather than a DNN 500.

Figure 7:
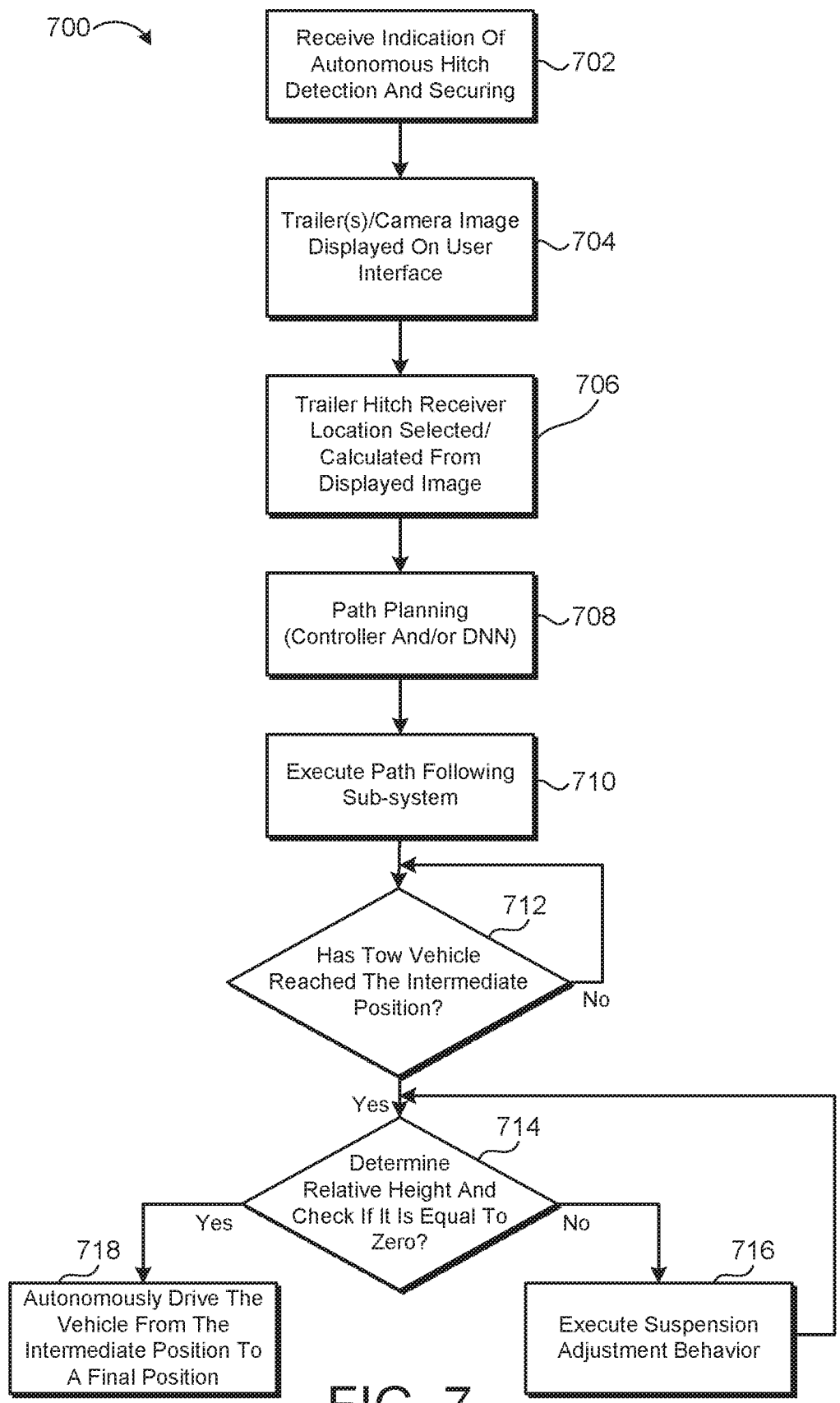
FIG. 7 is a flow diagram of an exemplary arrangement of operations for operating a tow vehicle in reverse for attachment to a trailer.

FIG. 7 illustrates an example arrangement of operations for a method 700 of autonomously maneuvering a tow vehicle 100 (as shown in FIGS. 1-5) towards a selected trailer 200. At block 702, the method 700 includes receiving an indication that a driver wants to autonomously hitch the tow vehicle 100 to a trailer 200. The indication may be by way of a selection on the user interface 140 of the tow vehicle 100, putting the tow vehicle in reverse (without reversing), or any other indication. At block 704, the controller 300/DNN 500 detects a trailer and identifies a trailer hitch receiver and other trailer data, including at least one trailer edge. At decision block 706, the method 700 determines the angular difference θ between the tow vehicle fore-aft axis Y and the trailer fore-aft axis T and the pixel distance (λ) between the hitch ball 162 and the hitch receiver 212 with the hitch location system 520. At block 708, the method 700 includes planning a path 552 from an initial position $P_I$ of the tow vehicle 100 to a final position $P_F$ with respect to the selected trailer 200. In some examples, the path planning system plans the path 552. The path planning system 550 may be part of the controller 300 or part of the DNN 500. At block 710, the method 700 includes executing the path following sub-system 320. At decision block 712, the method 700 determines if the tow vehicle 100 is within a predetermined distance from the selected trailer 200, i.e., the method 700 determines if the tow vehicle 100 has reached the intermediate position $P_M$. When the tow vehicle 100 reaches the intermediate position $P_M$, the method 700 at decision block 712 determines a relative height $H_R$ between a top portion of the hitch ball 162 of the tow vehicle 100 and a bottom portion of the hitch coupler 212 of the selected trailer 200 and determines if the hitch coupler 212 can releasably receive the hitch ball 162 based on the relative height $H_R$. In other words, the method 700 determines if the relative height $H_R$ equals to zero. If the relative height $H_R$ is not equal to zero, then at block 716, the method 700 adjusts the suspension of the tow vehicle 100 and then determines the relative height $H_R$ and checks if the relative height $H_R$ equals zero at block 714. Once relative height $H_R$ is equal to zero, then the method 700 at block 618 continues maneuvering about the path 552 from the intermediate position $P_M$ to a final position $P_F$ connecting the hitch ball 162 of the tow vehicle 100 with the hitch coupler 212 of the selected trailer 200.

The above implementations may include one or more of the following features. The final position places the tow vehicle hitch coupler 162 within a distance from the center of the trailer hitch coupler 212 that is less than or equal to the size of the trailer hitch coupler 212. The final position places the tow vehicle hitch 162 within a distance from the center of the trailer hitch coupler 212 that is less than or equal to half the size of the trailer hitch coupler 212. Alternatively, the final position places the tow vehicle hitch 162 within a distance from the center of the trailer hitch coupler 212 is sufficiently close to couple the tow vehicle hitch 162 and the trailer hitch coupler 212 to one another without further maneuvers of the tow vehicle 100.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of maneuvering a tow vehicle in reverse for attachment to a trailer, the method comprising:
   detecting, by a neural network of the tow vehicle, one or more trailers within one or more images;
   detecting, by the neural network, a trailer hitch receiver in the image;
   determining, at a computing device in communication with the neural network, a pixel angular difference in the image between a tow vehicle fore-aft axis in the image and a trailer fore-aft axis in the image;
   determining, at the computing device, a pixel distance in the image between a first image coordinate of a location of a tow vehicle hitch and a second image coordinate of a location of a hitch receiver;
   determining, at the computing device, a vehicle path based on the pixel angular difference and the pixel distance from an initial position to a final position adjacent the trailer, the vehicle path comprising maneuvers configured to move the tow vehicle along the vehicle path from the initial position to the final position; and
   autonomously following, at a drive system in communication with the computing device, the vehicle path from the initial position to the final position.

2. The method of claim 1, further comprising stopping or halting, at the drive system, the tow vehicle at an intermediate position before reaching the final position, the intermediate position being closer to the final position than the initial position;
   modifying, at the drive system, one or more vehicle suspensions associated with the tow vehicle to align a vehicle hitch with a trailer hitch;
   autonomously following, at the drive system, the vehicle path from the intermediate position to the final position; and
   connecting, at the drive system, the vehicle hitch with the trailer hitch.

3. The method of claim 1, wherein connecting the tow vehicle hitch with the trailer hitch receiver comprises modifying one or more vehicle suspensions associated with the tow vehicle to align a vehicle hitch with a trailer hitch.

4. The method of claim 1, wherein the maneuvers include, steering, braking, and speeding.

5. The method of claim 1, further comprising:
   continuously detecting, at the neural network, one or more objects within the vehicle path as the tow vehicle is moving along the vehicle path; and
   when detecting an object, altering the vehicle path at the computing device.

6. The method of claim 1, wherein detecting one or more trailers comprises:
   capturing, at one or more imaging devices in communication with the neural network, one or more images, at least one of the one or more imaging devices positioned on a back side of the trailer facing a rearward direction; and
   determining, at the neural network, the trailer hitch receiver within the one or more images.

7. The method of claim 1, wherein the final position places the tow vehicle hitch within a distance from a center of a trailer hitch coupler that is less than or equal to a diameter of the trailer hitch coupler.

8. The method of claim 7, wherein the final position places the tow vehicle hitch within a distance from the center of the trailer hitch coupler that is less than or equal to half the diameter of the trailer hitch coupler.

9. The method of claim 1, wherein the final position places the tow vehicle hitch within a distance from a center of a trailer hitch coupler is sufficiently close to couple the tow vehicle hitch and the trailer hitch coupler without further maneuvers of the tow vehicle.

10. A method of maneuvering a tow vehicle in reverse for attachment to a trailer positioned behind the tow vehicle, the method comprising:
    receiving, at a user interface, a trailer hitch receiver image location of a trailer hitch receiver selected by a driver within one or more images from at least one vehicle camera;
    determining, at a computing device in communication with the user interface, a pixel angular difference in the image between a tow vehicle fore-aft axis in the image and a trailer fore-aft axis in the image;
    determining, at the computing device, a pixel distance in the image between a first image coordinate of a location of a tow vehicle hitch and a second image coordinate of a location of a trailer hitch receiver;
    determining, at the computing device, a vehicle path based on the pixel angular difference and the pixel distance from an initial position to a final position adjacent the trailer, the vehicle path comprising maneuvers configured to move the tow vehicle along the vehicle path from the initial position to the final position; and
    autonomously following, at a drive system in communication with the computing device, the vehicle path from the initial position.

11. The method of claim 10, further comprising:
    stopping or halting, at the drive system, the tow vehicle at an intermediate position before reaching the final position, the intermediate position being closer to the final position than the initial position;
    modifying, at the drive system, one or more vehicle suspensions associated with the tow vehicle to align a vehicle hitch with a trailer hitch;
    autonomously following, at the drive system, the vehicle path from the intermediate position to the final position; and
    connecting, at the drive system, the vehicle hitch with the trailer hitch.

12. The method of claim 10, wherein the maneuvers include, steering, braking, and speeding.

13. The method of claim 10, wherein connecting the tow vehicle hitch with the trailer hitch receiver comprises modifying one or more vehicle suspensions associated with the tow vehicle to align a vehicle hitch with a trailer hitch.

14. The method of claim 10, wherein the final position places the tow vehicle hitch within a distance from a center of a trailer hitch coupler that is less than or equal to a diameter of the trailer hitch coupler.

15. The method of claim 14, wherein the final position places the tow vehicle hitch within a distance from the center of the trailer hitch coupler that is less than or equal to half the diameter of the trailer hitch coupler.

16. The method of claim 10, wherein the final position places the tow vehicle hitch within a distance from a center of a trailer hitch coupler is sufficiently close to couple the tow vehicle hitch and the trailer hitch coupler without further maneuvers of the tow vehicle.

\* \* \* \* \*